US012095548B2

(12) United States Patent
Takahashi et al.

(10) Patent No.: US 12,095,548 B2
(45) Date of Patent: Sep. 17, 2024

(54) MULTIPLEX TRANSMISSION SYSTEM AND CONNECTION METHOD BETWEEN PORTS FOR MULTIPLEX TRANSMISSION SYSTEM

(71) Applicant: NIPPON TELEGRAPH AND TELEPHONE CORPORATION, Tokyo (JP)

(72) Inventors: Keita Takahashi, Musashino (JP); Hiroko Nomura, Musashino (JP); Naotaka Shibata, Musashino (JP); Tomoya Hatano, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 89 days.

(21) Appl. No.: 18/012,441

(22) PCT Filed: Jun. 29, 2020

(86) PCT No.: PCT/JP2020/025529
§ 371 (c)(1),
(2) Date: Dec. 22, 2022

(87) PCT Pub. No.: WO2022/003778
PCT Pub. Date: Jan. 6, 2022

(65) Prior Publication Data
US 2023/0261779 A1  Aug. 17, 2023

(51) Int. Cl.
*H04J 14/02* (2006.01)
*H04B 10/40* (2013.01)
(Continued)

(52) U.S. Cl.
CPC .......... *H04J 14/0289* (2013.01); *H04Q 11/04* (2013.01); *H04B 10/40* (2013.01);
(Continued)

(58) Field of Classification Search
None
See application file for complete search history.

(56) References Cited

U.S. PATENT DOCUMENTS 5,936,954 A * 8/1999 Song ................... H04L 49/1561
370/398
6,538,781 B1 * 3/2003 Beierle ............... H04J 14/0232
398/79
(Continued)

OTHER PUBLICATIONS

Written Opinion for PCT/JP2020/025529 dated Nov. 24, 2020 (Year: 2020).*
(Continued)

*Primary Examiner* — Darren E Wolf
(74) *Attorney, Agent, or Firm* — Harness, Dickey & Pierce, P.L.C.

(57) ABSTRACT

Provided is a multiplex transmission system capable of preventing occurrence of a mistake on connection of a client device to a multiplex transmission device. The multiplex transmission system includes: a detection means configured to detect new client connection that is new connection of a client device to a client port of each of a first multiplex transmission device 100 and a second multiplex transmission device 200; and a switch control unit 340 configured to control a switch unit 330 to connect a client port where new client connection is detected at a first time point in the first multiplex transmission device 100 with a client port where new client connection is detected at a second time point in the second multiplex transmission device, when a time interval between the first time point at which new client connection is detected in the first multiplex transmission device 100 and the second time point at which new client connection is detected in the second multiplex transmission device 200 is within a preset reference time, in a case where new client connection is detected in both the first multiplex
(Continued)

transmission device 100 and the second multiplex transmission device 200.

4 Claims, 4 Drawing Sheets

(51) Int. Cl.
    *H04B 10/50*         (2013.01)
    *H04B 10/60*         (2013.01)
    *H04Q 11/04*         (2006.01)

(52) U.S. Cl.
    CPC .............. *H04B 10/50* (2013.01); *H04B 10/60* (2013.01); *H04Q 2213/13292* (2013.01)

(56) References Cited

U.S. PATENT DOCUMENTS

| | | | | |
|---|---|---|---|---|
| 6,570,521 | B1* | 5/2003 | Schofield | H03M 1/0673 |
| | | | | 341/143 |
| 2010/0254652 | A1* | 10/2010 | Kirkpatrick | H04Q 11/0005 |
| | | | | 398/45 |
| 2016/0261363 | A1* | 9/2016 | Nakada | H04J 14/0258 |
| 2017/0105060 | A1* | 4/2017 | Oltman | H04Q 11/0005 |
| 2021/0021347 | A1* | 1/2021 | Nakada | H04J 14/0258 |

OTHER PUBLICATIONS

ISR for PCT/JP2020/025529 dated Nov. 24, 2020 (Year: 2020).*
Junichi Kani, Optical Interface Standardization Trends for Access Networks, NTT Technical Journal, vol. 19, No. 7, 2007, pp. 46-49.

* cited by examiner

MULTIPLEX TRANSMISSION SYSTEM AND CONNECTION METHOD BETWEEN PORTS FOR MULTIPLEX TRANSMISSION SYSTEM

CROSS-REFERENCE TO RELATED APPLICATIONS

This application is a 371 U.S. National Phase of International Application No. PCT/JP2020/025529, filed on Jun. 29, 2020. The entire disclosure of the above application is incorporated herein by reference.

TECHNICAL FIELD

The present disclosure relates to a multiplex transmission system and an inter-port connection method of the multiplex transmission system.

BACKGROUND ART

Non Patent Literature 1 discloses a multiplex transmission system that multiplexes and transmits a plurality of signals between two points. Specifically, Non Patent Literature 1 discloses a multiplex transmission system that multiplexes a plurality of signals by using wavelength division multiplexing (WDM). A multiplex transmission device that demultiplexes a wavelength is installed at each of the two points where transmission is performed.

CITATION LIST

Non Patent Literature

Non Patent Literature 1: Optical interface standardization trend of access network, NTT Network Service Systems Laboratories, NTT Technical Journal, July 2007, p. 46-49

SUMMARY OF INVENTION

Technical Problem

In the multiplex transmission system as described in Non Patent Literature 1, for example, in a case where there is a plurality of client devices connected at each of the two points where transmission is performed, and the like, the multiplex transmission device at each point is provided with a plurality of client ports to which the client devices are connected. Conventionally, a correspondence between the plurality of client ports provided in the multiplex transmission devices at two points is fixed. Therefore, unless a client device that performs communication is correctly connected to a corresponding client port of the multiplex transmission device, communication between the corresponding client devices with each other cannot be established. When a client device is erroneously connected to a client port that is not corresponding, reconnection work on site occurs.

The present disclosure has been made to solve such a problem. An object is to provide a multiplex transmission system and an inter-port connection method of the multiplex transmission system capable of preventing occurrence of a mistake on connection of a client device to a multiplex transmission device provided with a plurality of client ports and suppressing occurrence of reconnection work on site.

Solution to Problem

A multiplexing transmission system according to the present disclosure is a multiplexing transmission system that multiplexes and transmits a plurality of signals between a first multiplex transmission device and a second multiplex transmission device, in which each of the first multiplex transmission device and the second multiplex transmission device includes a plurality of client ports to which a client device is connectable, and either one of the first multiplex transmission device and the second multiplex transmission device further includes: a switch unit configured to connect any one of a plurality of the client ports of the first multiplex transmission device with any one of a plurality of the client ports of the second multiplex transmission device; a detection means configured to detect new client connection that is new connection of a client device to each of the client ports of each of the first multiplex transmission device and the second multiplex transmission device; and a switch control unit configured to control the switch unit to connect a client port where new client connection is detected among the client ports of the first multiplex transmission device with a client port where new client connection is detected among the client ports of the second multiplex transmission device, when a time interval between a first time point at which new client connection is detected in the first multiplex transmission device and a second time point at which new client connection is detected in the second multiplex transmission device is within a reference time that is preset, in a case where new client connection is detected in both the first multiplex transmission device and the second multiplex transmission device.

An inter-port connection method of a multiplex transmission system according to the present disclosure is a method for connecting a plurality of client ports provided in a first multiplex transmission device with a plurality of client ports provided in a second multiplex transmission device, in a multiplex transmission system that multiplexes and transmits a plurality of signals between the first multiplex transmission device and the second multiplex transmission device. The inter-port connection method includes: a detection step of detecting new client connection that is new connection of a client device to each of the client ports of each of the first multiplex transmission device and the second multiplex transmission device; and a switch control step of controlling a switch unit provided in either one of the first multiplex transmission device and the second multiplex transmission device and configured to connect any one of a plurality of the client ports of the first multiplex transmission device with any one of a plurality of the client ports of the second multiplex transmission device, in which the switch control step includes a connection step of controlling the switch unit to connect a client port where new client connection is detected among the client ports of the first multiplex transmission device with a client port where new client connection is detected among the client ports of the second multiplex transmission device, when a time interval between a first time point at which new client connection is detected in the first multiplex transmission device and a second time point at which new client connection is detected in the second multiplex transmission device is within a reference time that is preset, in a case where new client connection is detected in both the first multiplex transmission device and the second multiplex transmission device.

Advantageous Effects of Invention

According to a multiplex transmission system and an inter-port connection method of the multiplex transmission system according to the present disclosure, there is an effect that it is possible to prevent occurrence of a mistake on connection of a client device to a multiplex transmission device provided with a plurality of client ports, and to suppress occurrence of reconnection work on site.

DESCRIPTION OF EMBODIMENTS

Figure 1:
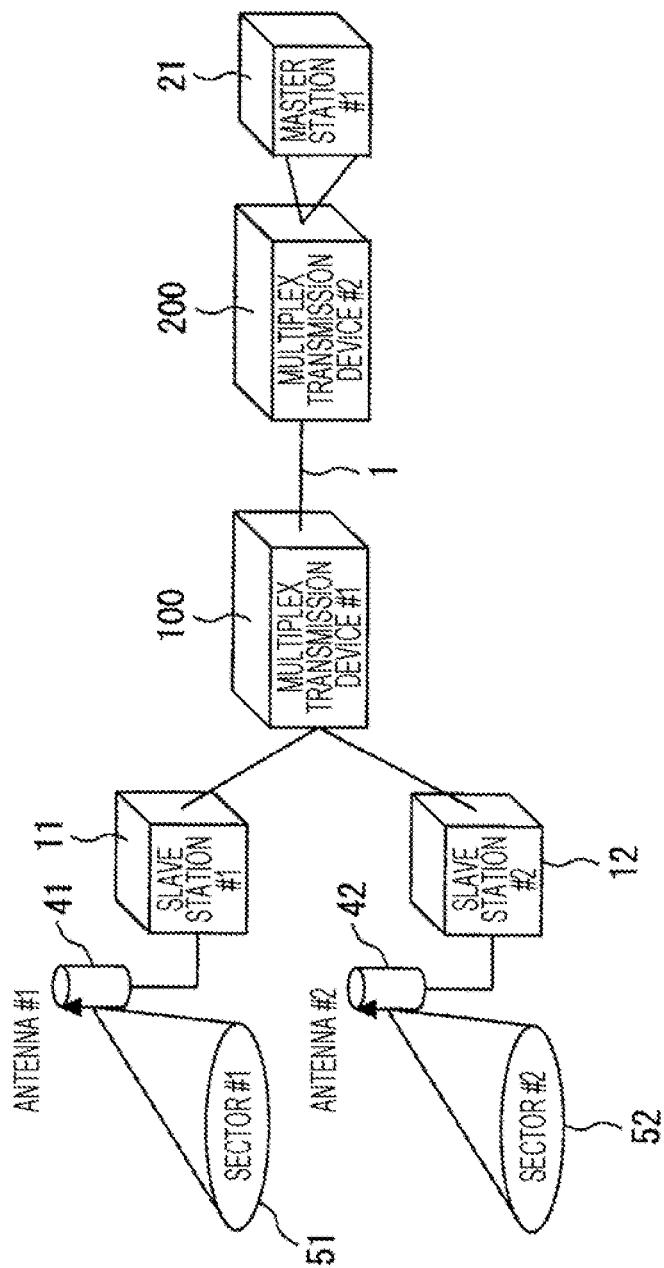
FIG. 1 is a diagram schematically illustrating an example of an overall configuration of a multiplex transmission system according to a first embodiment.

Embodiments for implementing a multiplex transmission system and an inter-port connection method of the multiplex transmission system according to the present disclosure will be described with reference to the accompanying drawings. In each figure, the same or corresponding parts are denoted by the same reference numerals, and redundant description is appropriately simplified or omitted. In the following description, for convenience, a positional relationship of each structure may be expressed with reference to the illustrated state. Note that the present disclosure is not limited to the following embodiments, and it is possible to freely combine the individual embodiments, modify any components of the individual embodiments, or omit any component of the individual embodiments within the scope not departing from the gist of the present disclosure.

First Embodiment

Figure 2:
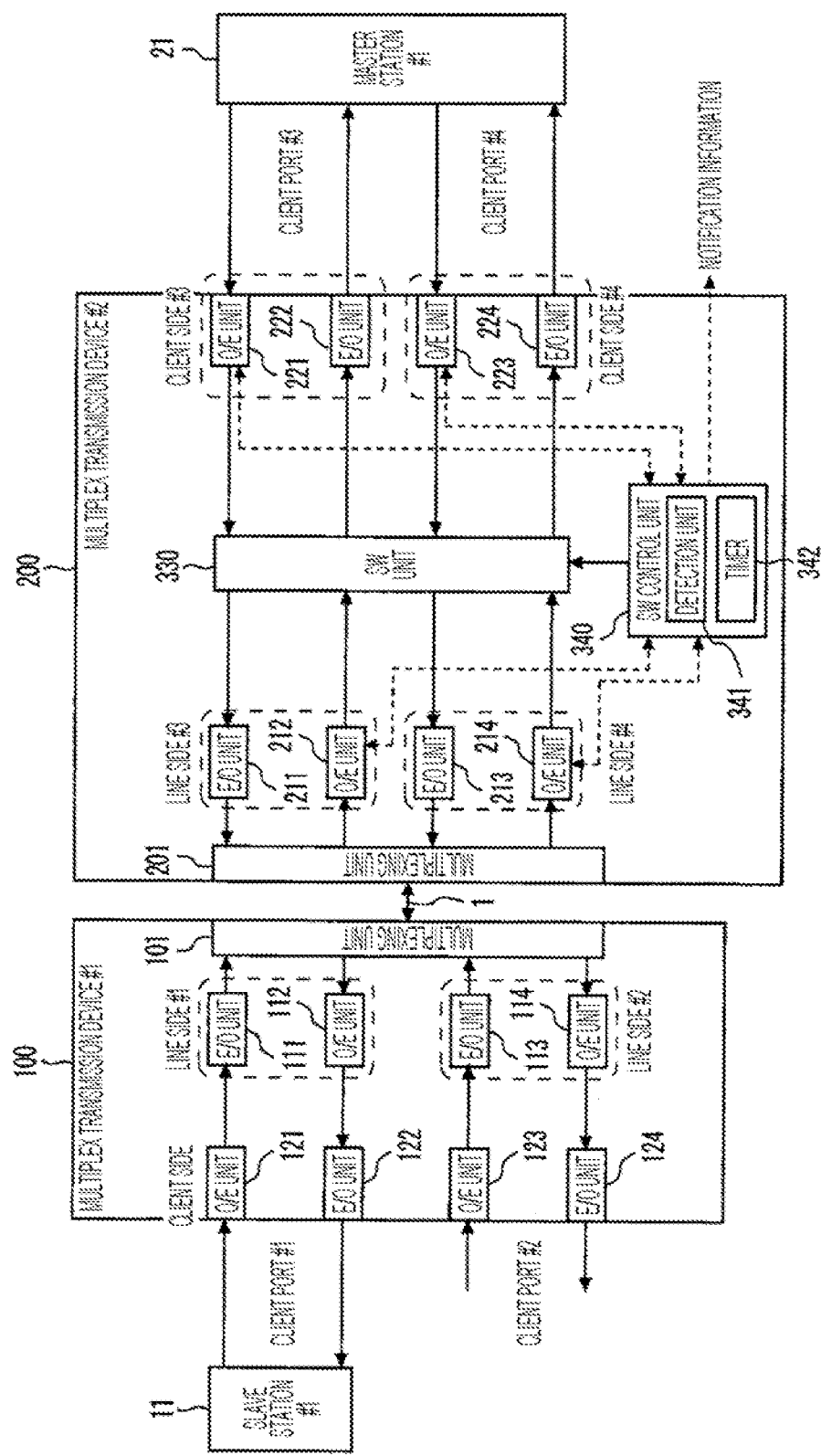
FIG. 2 is a block diagram illustrating a configuration of a multiplex transmission device included in the multiplex transmission system according to the first embodiment.
Figure 3:
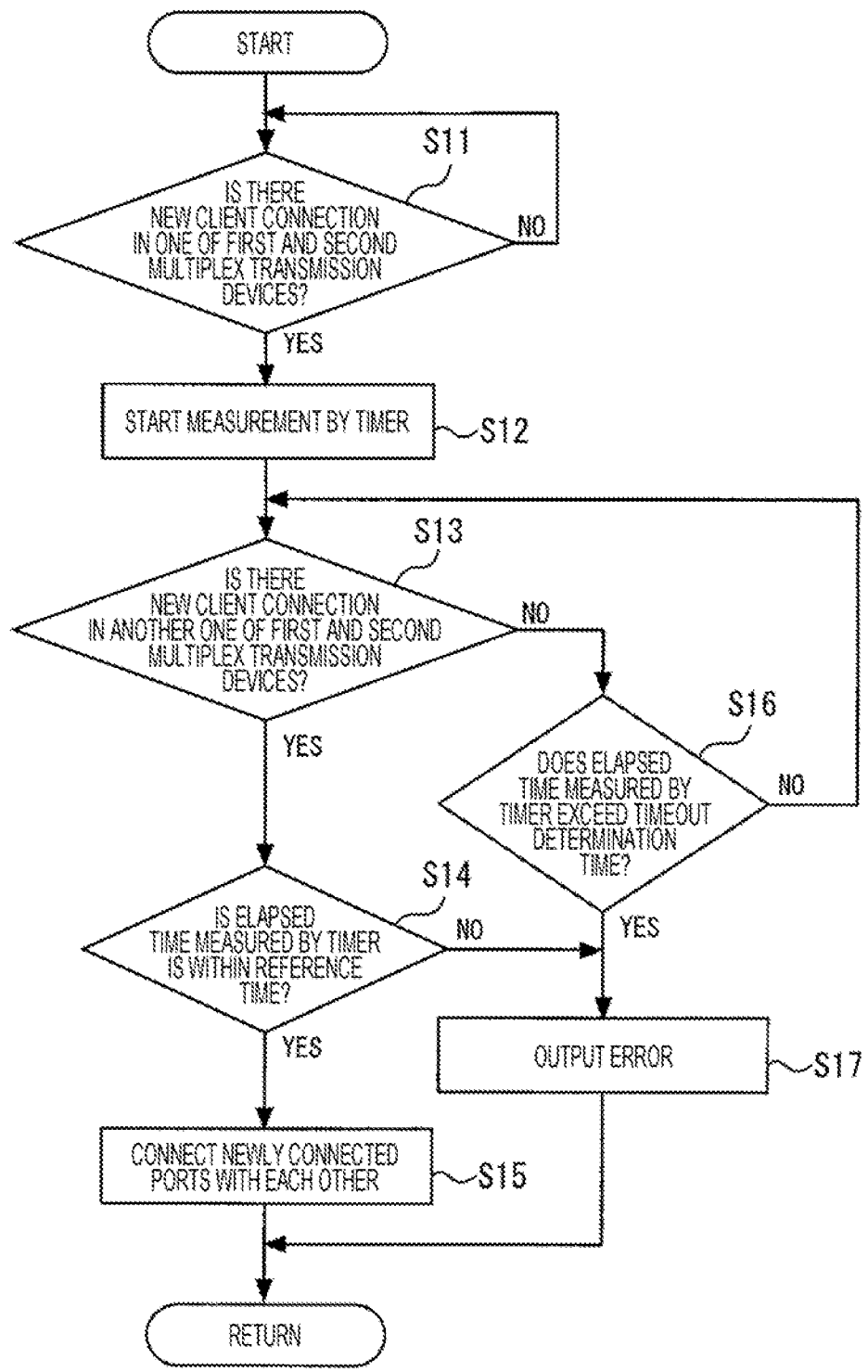
FIG. 3 is a flowchart illustrating a flow of an inter-port connection method of the multiplex transmission system according to the first embodiment.
Figure 4:
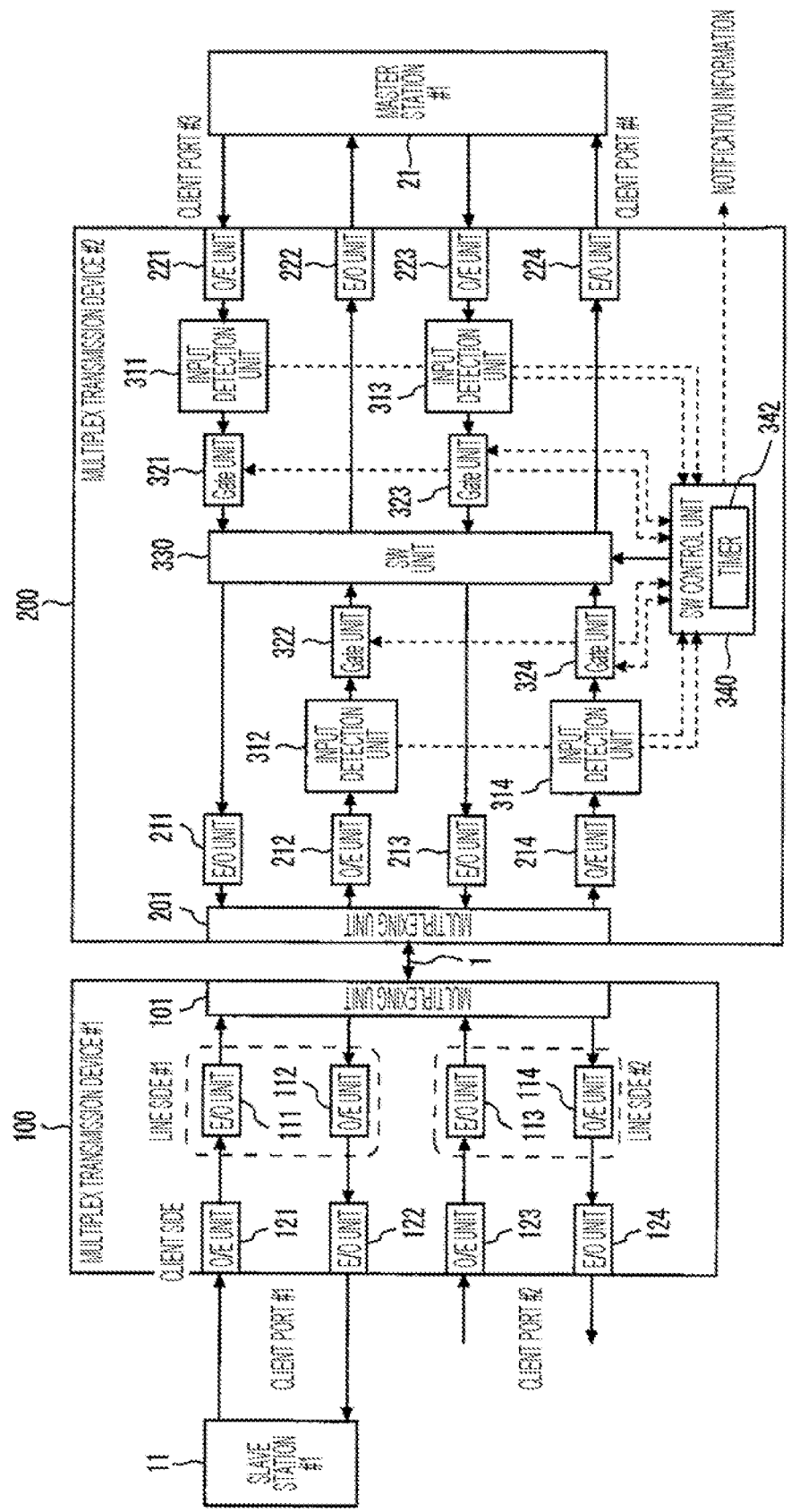
FIG. 4 is a block diagram illustrating a configuration of a modification of the multiplex transmission device included in the multiplex transmission system according to the first embodiment.

A first embodiment of the present disclosure will be described with reference to FIGS. 1 to 3. FIG. 1 is a diagram schematically illustrating an example of an overall configuration of a multiplex transmission system. FIG. 2 is a block diagram illustrating a configuration of a multiplex transmission device included in the multiplex transmission system. FIG. 3 is a flowchart illustrating a flow of an inter-port connection method of multiplex transmission system. FIG. 4 is a block diagram illustrating a configuration of a modification of the multiplex transmission device included in the multiplex transmission system.

As illustrated in FIG. 1, the multiplex transmission system according to the present embodiment includes a first multiplex transmission device 100 and a second multiplex transmission device 200. The multiplex transmission system of the present embodiment is a system that multiplexes and transmits a plurality of signals between the first multiplex transmission device 100 and the second multiplex transmission device 200. The multiplex transmission system according to the present disclosure can be applied to a system using various known signal multiplexing methods. Specific examples of the signal multiplexing method include wavelength division multiplex (WDM), frequency division multiplex (FDM), time division multiplex (TDM), and code division multiplex (CDM). Here, an example in a case where wavelength division multiplexing (WDM) is used will be described.

The first multiplex transmission device 100 and the second multiplex transmission device 200 are communicably connected by an optical fiber cable 1. By multiplexing signals communicated between the first multiplex transmission device 100 and the second multiplex transmission device 200 via the optical fiber cable 1, it is possible to reduce the number of the optical fiber cables 1 required to transmit a plurality of signals between two points.

One or more slave stations are communicably connected to one of the first multiplex transmission device 100 and the second multiplex transmission device 200. One or more master stations are communicably connected to another one of the first multiplex transmission device 100 and the second multiplex transmission device 200. In the illustrated configuration example, a first slave station 11 and a second slave station 12, which are two slave stations, are connected to the first multiplex transmission device 100, and a first master station 21, which is one master station, is connected to the second multiplex transmission device 200. The first master station 21 communicates with each of the first slave station 11 and the second slave station 12 via the first multiplex transmission device 100, the optical fiber cable 1, and the second multiplex transmission device 200.

When the multiplex transmission system is applied to, for example, a mobile fronthaul of an open radio access network (O-RAN), the first master station 21 is a central unit (CU) and/or a distributed unit (DU) of a base station. Further, in this case, the first slave station 11 and the second slave station 12 correspond to radio units (RUs).

To the first slave station 11, a first antenna 41 is connected. By an area where the first antenna 41 can receive radio waves, a first sector 51 is formed. To the second slave station 12, a second antenna 42 is connected. By an area where the second antenna 42 can receive radio waves, a second sector 52 is formed. Usually, three or six sectors are often provided for one master station.

One master station is provided with signal input/output ports corresponding to individual sectors for which the master station is responsible for. For example, in a case where three sectors are provided for one master station, three input/output ports are provided in the master station. Then, each input/output port of the master station and the slave station of each sector need to be connected in one-to-one correspondence. Therefore, the first multiplex transmission device 100 connected to the slave station of each sector is provided with client ports of the same number as that of the sectors. Further, the second multiplex transmission device 200 is also provided with client ports of the same number as that of the input/output ports of the master station. For example, in a case where three sectors are provided for one master station as described above, three client ports are required for each of the first multiplex transmission device 100 and the second multiplex transmission device 200.

However, here, in order to facilitate understanding and illustration, it is assumed that the first sector 51 and the second sector 52, which are two sectors, are provided for one first master station 21. Therefore, in each of the first multiplex transmission device 100 and the second multiplex transmission device 200, two client ports are provided. For easy distinction, the two client ports provided in the first multiplex transmission device 100 are referred to as a first client port and a second client port, and the two client ports provided in the second multiplex transmission device 200 are referred to as a third client port and a fourth client port. Note that, in each figure, "first" is indicated by "#1", "second" is indicated by "#2", "third" is indicated by "#3", and "fourth" is indicated by "#4".

Next, configurations of the first multiplex transmission device 100 and the second multiplex transmission device 200 included in the multiplex transmission device of the present embodiment will be described with reference to FIG. 2. The master station and the slave station connected to the first multiplex transmission device 100 and the second multiplex transmission device 200 are collectively referred to as a client device here. As described above, each of the first multiplex transmission device 100 and the second multiplex transmission device 200 is provided with a plurality of client ports to which the client device is connectable.

The first multiplex transmission device 100 includes the first client port and the second client port. Then, the first client port of the first multiplex transmission device 100 is provided with a first client-side O/E unit 121 and a first client-side E/O unit 122. Further, the second client port of the first multiplex transmission device 100 is provided with a second client-side O/E unit 123 and a second client-side E/O unit 124. The first multiplex transmission device 100 further includes a first line-side E/O unit 111, a first line-side O/E unit 112, a second line-side E/O unit 113, and a second line-side O/E unit 114, and a first multiplexing unit 101.

An optical signal inputted to the first client port of the first multiplex transmission device 100 is converted into an electric signal in the first client-side O/E unit 121 and is outputted to the first line-side E/O unit 111. The first line-side E/O unit 111 converts the inputted electric signal into an optical signal and outputs to the first multiplexing unit 101. Further, an optical signal inputted to the second client port of the first multiplex transmission device 100 is converted into an electric signal in the second client-side O/E unit 123 and is outputted to the second line-side E/O unit 113. The second line-side E/O unit 113 converts the inputted electric signal into an optical signal and outputs to the first multiplexing unit 101.

The first multiplexing unit 101 multiplexes the optical signals inputted from the first line-side E/O unit 111 and the second line-side E/O unit 113. The optical signal multiplexed in the first multiplexing unit 101 is transmitted from the first multiplex transmission device 100 to the second multiplex transmission device 200 via the optical fiber cable 1.

Whereas, a multiplexed optical signal transmitted from the second multiplex transmission device 200 to the first multiplex transmission device 100 via the optical fiber cable 1 is inputted to the first multiplexing unit 101. The first multiplexing unit 101 separates the inputted multiplexed signal, and outputs to each of the first line-side O/E unit 112 and the second line-side O/E unit 114.

The first line-side O/E unit 112 converts the optical signal inputted from the first multiplexing unit 101 into an electric signal and outputs to the first client-side E/O unit 122. The first client-side E/O unit 122 converts the inputted electric signal into an optical signal and outputs to the first client port of the first multiplex transmission device 100. Further, the second line-side O/E unit 114 converts the optical signal inputted from the first multiplexing unit 101 into an electric signal and outputs to the second client-side E/O unit 124. The second client-side E/O unit 124 converts the inputted electric signal into an optical signal and outputs to the second client port of the first multiplex transmission device 100.

As described above, the first line-side E/O unit 111, the first line-side O/E unit 112, the first client-side O/E unit 121, and the first client-side E/O unit 122 correspond to the first client port of the first multiplex transmission device 100. Further, the second line-side E/O unit 113, the second line-side O/E unit 114, the second client-side O/E unit 123, and the second client-side E/O unit 124 correspond to the second client port of the first multiplex transmission device 100.

The second multiplex transmission device 200 includes the third client port and the fourth client port. The third client port of the second multiplex transmission device 200 is provided with a third client-side O/E unit 221 and a third client-side E/O unit 222. Further, the fourth client port of the second multiplex transmission device 200 is provided with a fourth client-side O/E unit 223 and a fourth client-side E/O unit 224. The third client-side O/E unit 221 and the third client-side E/O unit 222 correspond to the third client port of the second multiplex transmission device 200. The fourth client-side O/E unit 223 and the fourth client-side E/O unit 224 correspond to the fourth client port of the second multiplex transmission device 200.

The second multiplex transmission device 200 further includes a third line-side E/O unit 211, a third line-side O/E unit 212, a fourth line-side E/O unit 213, and a fourth line-side O/E unit 214, and a second multiplexing unit 201. Then, in the multiplex transmission system of the present embodiment, the second multiplex transmission device 200 further includes a switch unit 330 and a switch control unit 340.

The switch unit 330 can connect any one of the plurality of client ports of the first multiplex transmission device 100 with any one of the plurality of client ports of the second multiplex transmission device 200. The switch control unit 340 controls connection between client ports by the switch unit 330. That is, the switch control unit 340 outputs connection information to the switch unit 330. Then, the switch unit 330 connects the client port of the first multiplex transmission device 100 with the client port of the second multiplex transmission device 200 in accordance with the designation by the connection information inputted from the switch control unit 340.

An optical signal inputted to the third client port of the second multiplex transmission device 200 is converted into an electric signal by the third client-side O/E unit 221 and is outputted to the switch unit 330. Further, an optical signal inputted to the fourth client port of the second multiplex transmission device 200 is converted into an electric signal in the fourth client-side O/E unit 223 and is outputted to the switch unit 330. The switch unit 330 outputs the electric signals inputted from the third client-side O/E unit 221 and the fourth client-side O/E unit 223 to the third line-side E/O unit 211 or the fourth line-side E/O unit 213, in accordance with the connection information from the switch control unit 340. The third line-side E/O unit 211 converts the inputted electric signal into an optical signal and outputs to the second multiplexing unit 201. The fourth line-side E/O unit 213 also converts the inputted electric signal into an optical signal and outputs to the second multiplexing unit 201.

The second multiplexing unit 201 multiplexes the optical signals inputted from the third line-side E/O unit 211 and the fourth line-side E/O unit 213. The optical signal multiplexed in the second multiplexing unit 201 is transmitted from the second multiplex transmission device 200 to the first multiplex transmission device 100 via the optical fiber cable 1.

Whereas, a multiplexed optical signal transmitted from the first multiplex transmission device 100 to the second multiplex transmission device 200 via the optical fiber cable 1 is inputted to the second multiplexing unit 201. The second multiplexing unit 201 separates the inputted multiplexed signal, and outputs to each of the third line-side O/E unit 212 and the fourth line-side O/E unit 214.

The third line-side O/E unit 212 converts the optical signal inputted from the second multiplexing unit 201 into an electric signal and outputs to the switch unit 330. Further, the fourth line-side O/E unit 214 also converts the optical signal inputted from the second multiplexing unit 201 into an electric signal and outputs to the switch unit 330. The switch unit 330 outputs the electric signals inputted from the third line-side O/E unit 212 and the fourth line-side O/E unit 214 to the third client-side E/O unit 222 or the fourth client-side E/O unit 224, in accordance with the connection information from the switch control unit 340. The third client-side E/O unit 222 converts the electric signal inputted from the switch unit 330 into an optical signal, and outputs to the third client port of the second multiplex transmission device 200. Further, the fourth client-side E/O unit 224 converts the electric signal inputted from the switch unit 330 into an optical signal, and outputs to the fourth client port of the second multiplex transmission device 200.

Here, a wavelength of the optical signal outputted from the first line-side E/O unit 111 to the first multiplexing unit 101 is the same as a wavelength of the optical signal inputted from the second multiplexing unit 201 to the third line-side O/E unit 212. Therefore, the signal outputted from the first line-side E/O unit 111 is inputted to the third line-side O/E unit 212. Then, a wavelength of the optical signal outputted from the third line-side E/O unit 211 to the second multiplexing unit 201 is the same as a wavelength of the optical signal inputted from the first multiplexing unit 101 to the first line-side O/E unit 112. Therefore, the signal outputted from the third line-side E/O unit 211 is inputted to the first line-side O/E unit 112.

Further, a wavelength of the optical signal outputted from the second line-side E/O unit 113 to the first multiplexing unit 101 is the same as a wavelength of the optical signal inputted from the second multiplexing unit 201 to the fourth line-side O/E unit 214. Therefore, the signal outputted from the second line-side E/O unit 113 is inputted to the fourth line-side O/E unit 214. Then, a wavelength of the optical signal outputted from the fourth line-side E/O unit 213 to the second multiplexing unit 201 is the same as a wavelength of the optical signal inputted from the first multiplexing unit 101 to the second line-side O/E unit 114. Therefore, the signal outputted from the fourth line-side E/O unit 213 is inputted to the second line-side O/E unit 114.

As described above, the third line-side E/O unit 211 and the third line-side O/E unit 212 of the second multiplex transmission device 200 correspond to the first client port of the first multiplex transmission device 100. Further, the fourth line-side E/O unit 213 and the fourth line-side O/E unit 214 of the second multiplex transmission device 200 correspond to the second client port of the first multiplex transmission device 100.

Next, control of the switch unit 330 by the switch control unit 340 in the multiplex transmission system according to the present embodiment will be described. The switch control unit 340 may be configured by a computer including a processor and a memory as hardware. The processor is also referred to as a central processing unit (CPU), a central processing device, a processing device, an arithmetic device, a microprocessor, a microcomputer, or a DSP. The memory corresponds to, for example, a nonvolatile or volatile semiconductor memory such as a RAM, a ROM, a flash memory, an EPROM, or an EEPROM, or a magnetic disk, a flexible disk, an optical disk, a compact disk, a mini disk, DVD, or the like.

In the memory of the switch control unit 340, a program as software is stored. Then, the switch control unit 340 implements the following functions as a result of executing preset processing with the processor executing the program stored in the memory, to cause cooperation between the hardware and the software.

As illustrated in FIG. 2, the switch control unit 340 includes a detection unit 341 and a timer unit 342. The switch control unit 340 monitors signals in each of the third line-side O/E unit 212, the fourth line-side O/E unit 214, the third client-side O/E unit 221, and the fourth client-side O/E unit 223. The detection unit 341 of the switch control unit 340 is a detection means that detects new connection of a client device to a client port of each of the first multiplex transmission device 100 and the second multiplex transmission device 200. Here, the new connection of the client device to the client port is referred to as "new client connection".

When there is a new signal input to an O/E unit for which a signal has not been detected so far, the detection unit 341 detects new client connection to a client port corresponding to the O/E unit. That is, when there is a new signal input to the third line-side O/E unit 212, the detection unit 341 detects new client connection to the first client port of the first multiplex transmission device 100. When there is a new signal input to the third line-side O/E unit 212, the detection unit 341 detects new client connection to the first client port of the first multiplex transmission device 100. When there is a new signal input to the fourth line-side O/E unit 214, the detection unit 341 detects new client connection to the second client port of the first multiplex transmission device 100. When there is a new signal input to the third client-side O/E unit 221, the detection unit 341 detects new client connection to the third client port of the second multiplex transmission device 200. When there is a new signal input to the fourth client-side O/E unit 223, the detection unit 341 detects new client connection to the fourth client port of the second multiplex transmission device 200.

Then, in a case where new client connection is detected in both the first multiplex transmission device 100 and the second multiplex transmission device 200, the switch control unit 340 determines a time interval between a first time point and a second time point. The first time point is a time point when new client connection is detected in the first multiplex transmission device 100. The second time point is a time point when new client connection is detected in the second multiplex transmission device 200. Note that a temporal order of the first time point and the second time point is not particularly limited. That is, the first time point may be earlier or the second time point may be earlier. Then, when the time interval between the first time point and the second time point is within a preset reference time, the switch control unit 340 outputs, to the switch unit 330, connection information designating connection of the client port for which new client connection is detected at the first time point in the first multiplex transmission device 100 with the client port for which new client connection is detected at the second time point in the second multiplex transmission device 200, to control the switch unit 330.

In the illustrated configuration example, the switch control unit 340 includes the timer unit 342 in order to determine whether or not the time interval between the first time point and the second time point is within the reference time. The timer unit 342 measures an elapsed time from an earlier time point among the first time point and the second time point. Then, when the elapsed time until a later time point among the first time point and the second time point measured by the timer unit 342 is within the reference time described above, the switch control unit 340 outputs, to the switch unit 330, connection information designating connection of the client port for which new client connection is detected at the first time point in the first multiplex transmission device 100 with the client port for which new client connection is detected at the second time point in the second multiplex transmission device 200, to control the switch unit 330.

Further, when there is a new signal input to the third line-side O/E unit 212 or the fourth line-side O/E unit 214, the switch control unit 340 outputs notification information to the outside. The notification information is information for notifying that there is a new signal input on a line-side of the second multiplex transmission device 200, that is, notifying that there is new client connection to the first multiplex transmission device 100. For example, when an operator who establishes new connection of a client device to the second multiplex transmission device 200 connects the client device within the reference time described above after confirming the notification information, a client device newly connected to the first multiplex transmission device 100 can be connected to a client device newly connected to the second multiplex transmission device 200.

Next, an operation flow of the multiplex transmission system configured as described above will be described with reference to FIG. 3. First, in step S11, the switch control unit 340 determines whether or not the detection unit 341 has detected new client connection in one of the first multiplex transmission device 100 and the second multiplex transmission device 200. Then, when new client connection is detected in one of the first multiplex transmission device 100 and the second multiplex transmission device 200, the process proceeds to step S12. In step S12, the timer unit 342 starts measuring the elapsed time.

In subsequent step S13, the switch control unit 340 determines whether or not the detection unit 341 has detected new client connection in another one of the first multiplex transmission device 100 and the second multiplex transmission device 200. In a case where new client connection is not detected in another one of the first multiplex transmission device 100 and the second multiplex transmission device 200, the process proceeds to step S16. In step S16, the switch control unit 340 determines whether or not the elapsed time for which the measurement has been started by the timer unit 342 in step S12 exceeds a timeout determination time. The timeout determination time is set, in advance, to a length equal to or longer than the reference time described above. Then, if the elapsed time exceeds the timeout determination time, an error is outputted in step S17, and then the series of processing ends. Whereas, if the elapsed time does not exceed the timeout determination time, the process returns to step S13.

In a case where new client connection is detected in another one of the first multiplex transmission device 100 and the second multiplex transmission device 200 in step S13, the process proceeds to step S14. In step S14, the switch control unit 340 determines whether or not the elapsed time for which the measurement is started by the timer unit 342 in step S12 is within the reference time described above. If the elapsed time is not within the reference time, the process proceeds to step S17 to output an error, and then the series of processing ends. Whereas, when the elapsed time is within the reference time, the process proceeds to step S15.

In step S15, the switch control unit 340 outputs, to the switch unit 330, connection information designating connection between the client port where new client connection is detected in step S11 and the client port where new client connection is detected in step S13. Then, the switch unit 330 connects the client ports with each other where the new client connection is detected, in accordance with the connection information inputted from the switch control unit 340.

The inter-port connection method of the multiplex transmission system described above is a method for mutually connecting a plurality of client ports provided in each of the first multiplex transmission device 100 and the second multiplex transmission device 200, in a multiplex transmission system that multiplexes and transmits a plurality of signals between the first multiplex transmission device 100 and the second multiplex transmission device 200. Then, the inter-port connection method of the multiplex transmission system includes a detection step and a switch control step.

The detection step is a step of detecting new client connection to a client port of each of the first multiplex transmission device 100 and the second multiplex transmission device 200. The switch control step is a step of controlling the switch unit 330. Then, the switch control step includes a connection step. The connection step is a step of controlling the switch unit 330 to connect a client port where new client connection is detected in the first multiplex transmission device 100 with a client port where the new client connection is detected in the second multiplex transmission device 200, when the time interval between the first time point and the second time point is within a preset reference time, in a case where new client connection is detected in both the first multiplex transmission device 100 and the second multiplex transmission device 200.

Further, the connection step includes a timer step. The timer step is a step in which the timer unit 342 measures an elapsed time from an earlier time point among the first time point at which new client connection in the first multiplex transmission device 100 is detected and the second time point at which new client connection in the second multiplex transmission device 200 is detected. Then, the connection step is a step of controlling the switch unit 330 to connect a client port where new client connection is detected in the first multiplex transmission device 100 with a client port where new client connection is detected in the second multiplex transmission device 200, in a case where an elapsed time until a later time point among the first time point and the second time point measured in the timer step is within the reference time.

According to the multiplex transmission system configured as described above and the inter-port connection method of the multiplex transmission system, when a client device is connected to one of the two multiplex transmission devices and then a client device is connected to another multiplex transmission device within a preset reference time, client ports connected with these client devices can be connected with each other by the switch unit 330, even if the client ports connected with these client devices are any ports. Therefore, it is possible to prevent occurrence of a mistake on connection of a client device to the multiplex transmission device provided with a plurality of client ports, and to suppress occurrence of reconnection work on site.

Next, a modification of the multiplex transmission system according to the present embodiment will be described with reference to FIG. 4. As compared with a configuration example illustrated in FIG. 2, a configuration example illustrated in FIG. 4 is obtained by providing an input detection unit and a gate unit between each of the O/E units and the switch unit 330 instead of providing the detection unit 341 in the switch control unit 340.

In the configuration example illustrated in FIG. 4, a first client-side input detection unit 311 and a first client-side gate unit 321 are provided between the third client-side O/E unit 221 and the switch unit 330. A first line-side input detection unit 312 and a first line-side gate unit 322 are provided between the third line-side O/E unit 212 and the switch unit 330. A second client-side input detection unit 313 and a second client-side gate unit 323 are provided between the fourth client-side O/E unit 223 and the switch unit 330. A second line-side input detection unit 314 and a second line-side gate unit 324 are provided between the fourth line-side O/E unit 214 and the switch unit 330.

The first client-side input detection unit 311, the second client-side input detection unit 313, the first line-side input detection unit 312, and the second line-side input detection unit 314 are detection means that detect new connection of a client device to a client port of each of the first multiplex transmission device 100 and the second multiplex transmission device 200. A signal outputted from the third line-side O/E unit 212 is inputted to the first line-side input detection unit 312. The first line-side input detection unit 312 detects new client connection to the first client port of the first multiplex transmission device 100 when there is a new signal input. The signal inputted to the first line-side input detection unit 312 is buffered in the first line-side gate unit 322. A signal outputted from the fourth line-side O/E unit 214 is inputted to the second line-side input detection unit 314. The second line-side input detection unit 314 detects new client connection to the second client port of the first multiplex transmission device 100 when there is a new signal input. The signal inputted to the second line-side input detection unit 314 is buffered in the second line-side gate unit 324.

Further, a signal outputted from the third client-side O/E unit 221 is inputted to the first client-side input detection unit 311. The first client-side input detection unit 311 detects new client connection to the third client port of the second multiplex transmission device 200 when there is a new signal input. The signal inputted to the first client-side input detection unit 311 is buffered in the first client-side gate unit 321. A signal outputted from the fourth client-side O/E unit 223 is inputted to the second client-side input detection unit 313. The second client-side input detection unit 313 detects new client connection to the fourth client port of the second multiplex transmission device 200 when there is a new signal input. The signal inputted to the second client-side input detection unit 313 is buffered in the second client-side gate unit 323.

Then, in a case where new client connection is detected in both the first multiplex transmission device 100 and the second multiplex transmission device 200, the switch control unit 340 determines a time interval between a first time point and a second time point. As described above, the first time point is a time point when new client connection is detected in the first multiplex transmission device 100. The second time point is a time point when new client connection is detected in the second multiplex transmission device 200. Then, when the time interval between the first time point and the second time point is within a preset reference time, the switch control unit 340 outputs, to the switch unit 330, connection information designating connection of the client port for which new client connection is detected at the first time point in the first multiplex transmission device 100 with the client port for which new client connection is detected at the second time point in the second multiplex transmission device 200, to control the switch unit 330.

In the illustrated configuration example, the switch control unit 340 includes the timer unit 342 in order to determine whether or not the time interval between the first time point and the second time point is within the reference time. The timer unit 342 measures an elapsed time from an earlier time point among the first time point and the second time point. Then, when the elapsed time until a later time point among the first time point and the second time point measured by the timer unit 342 is within the reference time described above, the switch control unit 340 outputs, to the switch unit 330, connection information designating connection of the client port for which new client connection is detected at the first time point in the first multiplex transmission device 100 with the client port for which new client connection is detected at the second time point in the second multiplex transmission device 200, to control the switch unit 330.

Note that, when outputting the connection information to the switch unit 330, the switch control unit 340 transmits an output command to a gate unit corresponding to the client port to be connected by the switch unit 330. The gate unit having received the output command outputs a buffered signal to the switch unit 330. Other configurations are similar to those of the configuration example illustrated in FIG. 2.

In this way, according to the multiplex transmission system having the configuration illustrated in FIG. 4 and the inter-port connection method of the multiplex transmission system as well, similarly to the configuration example illustrated in FIG. 2, when a client device is connected to one of the two multiplex transmission devices and then the client device is connected to another multiplex transmission device within a preset reference time, client ports connected with these client devices can be connected with each other by the switch unit 330, even if the client ports connected with these client devices are any ports. Therefore, it is possible to prevent occurrence of a mistake on connection of a client device to the multiplex transmission device provided with a plurality of client ports, and to suppress occurrence of reconnection work on site.

Note that, in the above, the description has been given to a configuration example in a case where the switch unit 330 and the switch control unit 340 are provided in the second multiplex transmission device 200 to which the first master station 21 is connected. However, a place where the switch unit 330 and the switch control unit 340 are provided is not limited to the second multiplex transmission device 200. One or both of the switch unit 330 and the switch control unit 340 may be provided in the first multiplex transmission device 100. In a case where the switch unit 330 and the switch control unit 340 are separately provided in the first multiplex transmission device 100 and the second multiplex transmission device 200, the connection information from the switch control unit 340 is transmitted to the switch unit 330 via the optical fiber cable 1, for example. Further, in a configuration example including an input detection unit and a gate unit, some or all of them may be provided in the first multiplex transmission device 100.

Further, the multiplex transmission device constituting the multiplex transmission system and the inter-port connection method of the multiplex transmission system according to the present disclosure can also be implemented by executing preset processing with a processor executing a program stored in a memory, to cause hardware and software to cooperate with each other. Then, the program for implementing the device and the method according to the present disclosure can be recorded in advance in an information recording medium. Further, the program for implementing the device and the method according to the present disclosure can also be provided through a communication network.

INDUSTRIAL APPLICABILITY

The present disclosure can be used for a multiplex transmission system that multiplexes and transmits a plurality of signals between a first multiplex transmission device and a second multiplex transmission device, and for an inter-port connection method of a multiplex transmission system for mutually connecting a plurality of client ports provided in each of the first multiplex transmission device and the second multiplex transmission device.

REFERENCE SIGNS LIST

1 Optical fiber cable
11 First slave station
12 Second slave station
21 First master station
41 First antenna
42 Second antenna
51 First sector
52 Second sector
100 First multiplex transmission device
101 First multiplexing unit
111 First line-side E/O unit
112 First line-side O/E unit
113 Second line-side E/O unit
114 Second line-side O/E unit
121 First client-side O/E unit
122 First client-side E/O unit
123 Second client-side O/E unit
124 Second client-side E/O unit
200 Second multiplex transmission device
201 Second multiplexing unit
211 Third line-side E/O unit
212 Third line-side O/E unit
213 Fourth line-side E/O unit
214 Fourth line-side O/E unit
221 Third client-side O/E unit
222 Third client-side E/O unit
223 Fourth client-side O/E unit
224 Fourth client-side E/O unit
311 First client-side input detection unit
312 First line-side input detection unit
313 Second client-side input detection unit
314 Second line-side input detection unit
321 First client-side gate unit
322 First line-side gate unit
323 Second client-side gate unit
324 Second line-side gate unit
330 Switch unit
340 Switch control unit
341 Detection unit
342 Timer unit

The invention claimed is:

1. A multiplex transmission system that multiplexes and transmits a plurality of signals between a first multiplex transmission device and a second multiplex transmission device, wherein each of the first multiplex transmission device and the second multiplex transmission device includes a plurality of client ports to which a client device is connectable, and either one of the first multiplex transmission device and the second multiplex transmission device further includes:

a switch unit configured to connect any one of a plurality of the client ports of the first multiplex transmission device with any one of a plurality of the client ports of the second multiplex transmission device;

a detection means configured to detect new client connection that is new connection of a client device to each of the client ports of each of the first multiplex transmission device and the second multiplex transmission device; and a switch control unit configured to control the switch unit to connect a client port where new client connection is detected among the client ports of the first multiplex transmission device with a client port where new client connection is detected among the client ports of the second multiplex transmission device, when a time interval between a first time point at which new client connection is detected in the first multiplex transmission device and a second time point at which new client connection is detected in the second multiplex transmission device is within a reference time that is preset, in a case where new client connection is detected in both the first multiplex transmission device and the second multiplex transmission device.

2. The multiplex transmission system according to claim 1, wherein the switch control unit includes a timer unit configured to measure an elapsed time from an earlier time point among the first time point and the second time point, and controls the switch unit to connect a client port where new client connection is detected among the client ports of the first multiplex transmission device with a client port where new client connection is detected among the client ports of the second multiplex transmission device, in a case where an elapsed time until a later time point among the first time point and the second time point measured by the timer unit is within the reference time.

3. An inter-port connection method of a multiplex transmission system, the inter-port connection method being for connecting a plurality of client ports provided in a first multiplex transmission device with a plurality of client ports provided in a second multiplex transmission device in the multiplex transmission system that multiplexes and transmits a plurality of signals between the first multiplex transmission device and the second multiplex transmission device, the multiplex transmission method comprising:

a detection step of detecting new client connection that is new connection of a client device to each of the client ports of each of the first multiplex transmission device and the second multiplex transmission device; and a switch control step of controlling a switch unit provided in either one of the first multiplex transmission device and the second multiplex transmission device and configured to connect any one of a plurality of the client ports of the first multiplex transmission device with any one of a plurality of the client ports of the second multiplex transmission device, wherein the switch control step includes a connection step of controlling the switch unit to connect a client port where new client connection is detected among the client ports of the first multiplex transmission device with a client port where new client connection is detected among the client ports of the second multiplex transmission device, when a time interval between a first time point at which new client connection is detected in the first multiplex transmission device and a second time point at which new client connection is detected in the second multiplex transmission device is within a reference time that is preset, in a case where new client connection is detected in both the first multiplex transmission device and the second multiplex transmission device.

4. The inter-port connection method of the multiplex transmission system according to claim 3, wherein the connection step includes:
a timer step of measuring an elapsed time from an earlier time point among the first time point and the second time point; and
a step of controlling the switch unit to connect a client port where new client connection is detected among the client ports of the first multiplex transmission device with a client port where new client connection is detected among the client ports of the second multiplex transmission device, in a case where an elapsed time until a later time point among the first time point and the second time point measured in the timer step is within the reference time.

* * * * *